No. 759,666. PATENTED MAY 10, 1904.
S. C. BURSON.
AUTOMATIC BRAKE.
APPLICATION FILED DEC. 23, 1903.
NO MODEL. 2 SHEETS—SHEET 1.
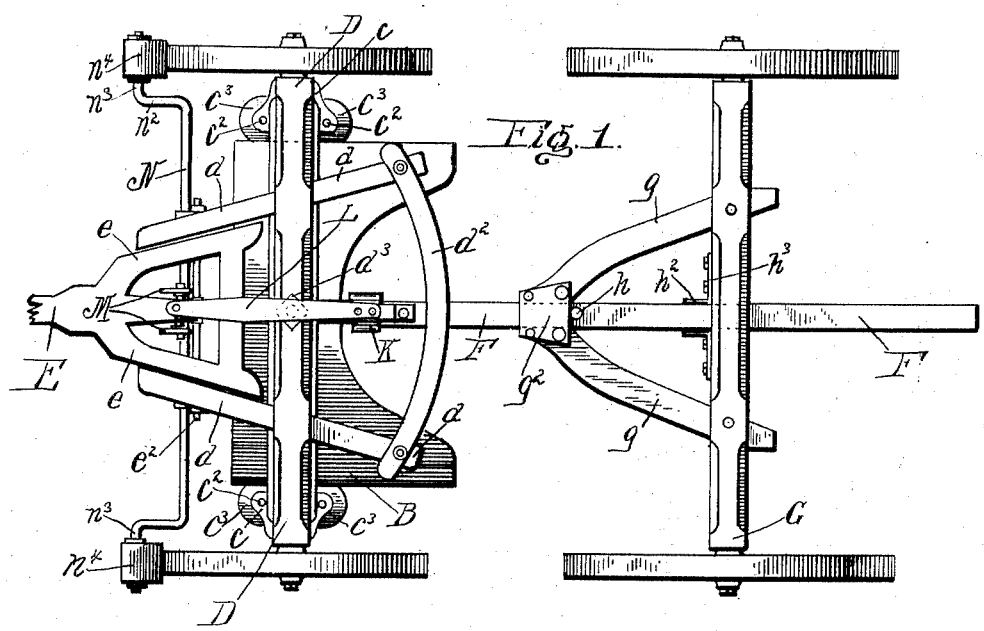
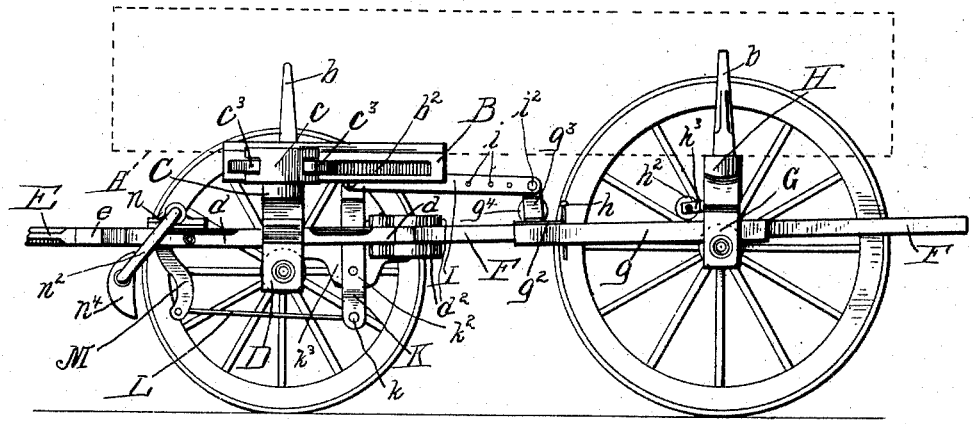
Witnesses
Eugene W. Hiney
E. T. Brandenburg
Inventor:
Schuyler C. Burson,
by
R. S. Dyrenforth,
Attorney.

No. 759,666. PATENTED MAY 10, 1904.
S. C. BURSON.
AUTOMATIC BRAKE.
APPLICATION FILED DEC. 23, 1903.
NO MODEL. 2 SHEETS—SHEET 2.

Witnesses
Eugene W. Hiney
E. T. Brandenburg

Inventor:
Schuyler C. Burson,
by
R. S. Dyrenforth,
his attorney.

No. 759,666.   Patented May 10, 1904.

UNITED STATES PATENT OFFICE.

SCHUYLER COLFAX BURSON, OF SHUBERT, NEBRASKA.

AUTOMATIC BRAKE.

SPECIFICATION forming part of Letters Patent No. 759,666, dated May 10, 1904.

Application filed December 23, 1903. Serial No. 186,337. (No model.)

*To all whom it may concern:*

Be it known that I, SCHUYLER COLFAX BURSON, a citizen of the United States, residing at Shubert, county of Richardson, and State of Nebraska, have invented certain new and useful Improvements in Automatic Brakes; and I do hereby declare the following to be a full, clear, and exact description of the invention, such as will enable others skilled in the art to which it appertains to make and use the same.

The object of this invention is to provide an exceedingly simple and thoroughly efficient form of automatic brake wherein the degree of pressure applied to the perimeters of the wheels by the brake-shoes shall when the wagon or other road vehicle is going downhill be proportioned to the weight of the load carried in the wagon and the incline of the grade, thus utilizing the force of gravity to lock or clamp the wheels, the brake-shoes being automatically withdrawn from contact with the peripheries of the wheels immediately the wagon reaches a level grade.

With this object in view, the invention consists in the novel construction and combination of parts of a brake mechanism, as will be hereinafter fully described and claimed.

In the accompanying drawings there is illustrated one embodiment of my invention, it being understood that the same is susceptible of other embodiments and still be within the spirit and range of my invention.

Figure 3:
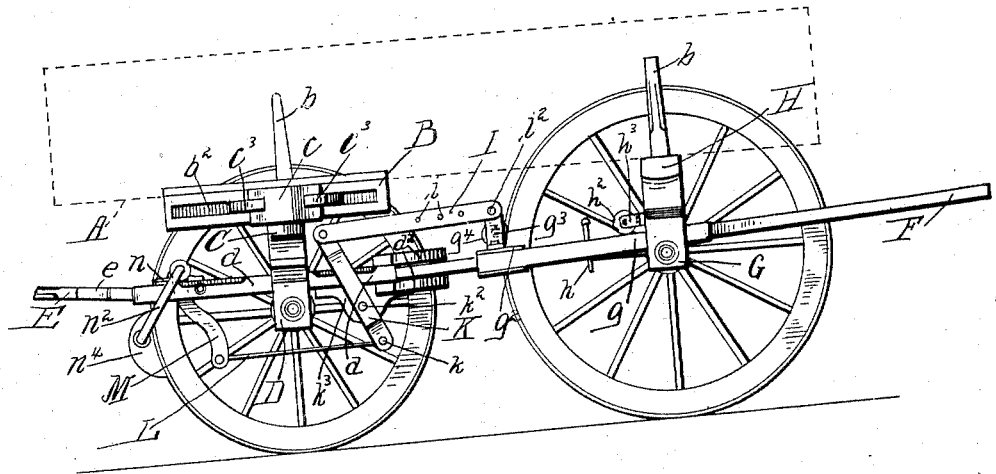
Figure 4:
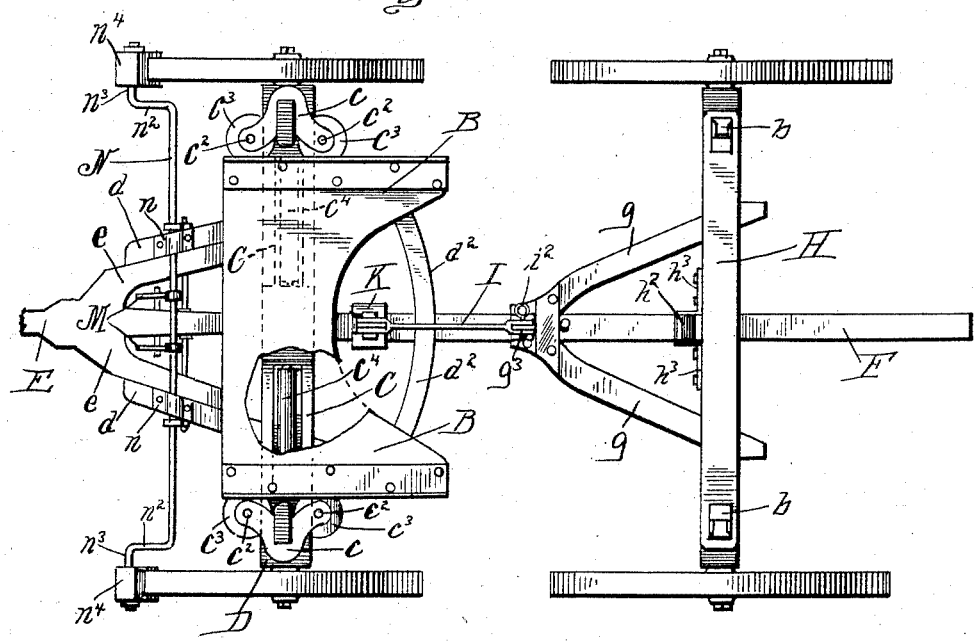

In the drawings, in which like letters of reference indicate corresponding parts in all the views, Figure 1 is a bottom plan view of the running-gear of a vehicle with my improved brake mechanism attached thereto. Fig. 2 is a side elevation of the same, the vehicle being on a level grade. Fig. 3 is a view similar to Fig. 2, the vehicle being shown as descending a hill and the brake mechanism in operation; and Fig. 4 is a top plan view of the running-gear of a vehicle with my improved brake mechanism attached, the wagon body and bed being removed.

While preferably used as a brake for the front wheels, because in operation more force to lock the wheels is thrown on the brake when so positioned, the brake of my invention may with slight modification be placed to lock the rear wheels, the principle of operation remaining the same.

Detachably secured to the front under side of the wagon-bed is a sliding bolster-plate B, preferably made of iron or steel or analogous material, which bolster-plate may be of any preferred shape and size, in this instance being approximately a foot long, the width of an ordinary wagon-bed, and having one side curved in the form of a semi-ellipse, and attached to the bolster-plate are the usual wagon-standards $b$. Each end of the bolster-plate running parallel with the length of the wagon-bed is provided with a groove or channel $b^2$.

By having the bolster-plate detachably secured to the wagon-bed the wagon-box may be removed and the brake mechanism applied to a hay-rack or the like, and the brake mechanism will operate equally as well therewith.

A bolster C, of iron or steel or the like, is arranged transversely of the bolster-plate B and carries on its two upper ends slotted heads or blocks $c\ c$, in the slots of which blocks are loosely mounted, as on pins $c^2$, ball-bearing rollers $c^3 c^3 c^3 c^3$, made of steel or the like, (one or a plurality of such rollers may be employed in each block, in this instance two rollers being shown in each block,) working in the two grooves $b^2$ of the bolster-plate B.

Properly supported and partly sunk in the upper transverse surface of the bolster C is a friction ball-bearing roller or rollers $c^4$, insuring easy frictionless movement of the sliding bolster-plate B on the bolster C.

The front axle D has swinging movement on the king-bolt $d^3$ as a pivot, so that turning of the wagon may be effected, a washer being, if desired, secured between the bolster C and the axle.

To the front axle D, carrying the usual wheels, are secured the usual hounds $d\ d$, the rear ends of the hounds being preferably connected by the semielliptical coupling-pieces $d^2\ d^2$.

E indicates the usual tongue, and $e\ e$ the usual tongue-hounds, the tongue and tongue-hounds being cast integral. The tongue-hounds are pivoted on a rod $e^2$, which rod also passes through the front ends of the hounds $d\ d$.

F indicates the longitudinally-extending reach connecting the front and rear axles, the rear end of the reach passing loosely between the rear axle G and the rear bolster-plate H, which plate is rigidly secured to the wagon-bed A.

A friction-roller $h^2$, carried by a bracket $h^3$, secured to the bolster-plate H, as shown in Figs. 2, 3, and 4, may be provided, insuring easy frictionless movement.

Rigidly secured to the rear bolster-plate H are the hind hounds $g\ g$, connected at their forward ends by the plate $g^2$, the reach passing loosely between these forward or apex ends. As the rear portion of the reach passes loosely between the bolster-plate H and the rear axle and also loosely through the apex ends of the hind hounds, (instead of being secured rigidly to said ends of the hind hounds, as usual,) this arrangement may be termed a "sliding coupling."

A stop-pin $h$ on the reach limits the rearward movement of the hind hounds.

A headed king-bolt $d^3$ passes through the front axle D, the forward end of the reach F, and the bolster C, firmly securing these parts together.

Bolted upon the upper forward ends of the hind hounds $g\ g$ is a bracket $g^3$, in which may be pivoted a friction-roller $g^4$. A perforation is made in the upper portion of the bracket mating with a perforation in the rear end of a push-bar I, the bar being secured to the upper end of the bracket by the pin $i^2$. This bar I extends parallel with the reach F and may be provided longitudinally with a plurality of openings $i$ to permit adjustment of the bar forward or backward relative to the bracket $g^3$, as may be required or desired.

At the forward end of the push-bar I is pivoted a vertical lever K, formed in two sections, connected at their lower ends by a pin $k$, the bifurcation of said lever straddling the reach, as shown in Fig. 3. It is obvious, however, that this vertical lever K may be secured direct to the bottom of the wagon-bed instead of being pivoted or connected to the push-bar I. The bifurcated lever K is also pivoted on a pin $k^2$, driven through a bracket $k^3$, rigidly secured to the under side of the reach F.

A longitudinally-extending draw-bar under the front axle is at one end pivoted to the lower end of the vertical lever K and at its other end to the brake-beam lever M.

The brake-beam levers M are rigidly connected with the brake-beam N, working in brackets $n\ n$, bolted to the upper forward ends of the hounds $d\ d$. The brake-beam N has at its ends brake-cranks $n^2\ n^2$, carrying arms $n^3\ n^3$ for attaching to the usual brake-shoes $n^4\ n^4$.

The operation of my improved brake mechanism will be obvious from the above detailed description. In descending a grade the sliding bolster-plate in front, the rollers in the rear, and the sliding coupling permit the rear wheels to advance forward with the wagon-bed the instant the wagon starts down the incline, the wagon-bed mounted on the sliding bolster-plate B, moving forward over the front bolster C. The advancing forward of the rear wheels forces forward the push-bar I on top of the sliding hind hounds. This in turn rocks the pivoted vertical lever K, which in turn pulls the draw-bar L rearward, which in turn exerts a pull on the brake-beam levers M to rock the same, turning the brake-beam N and bringing the brake-shoes $n^4$ against the peripheries of the wheels with a binding force proportioned to the weight of the load in the wagon and the degree of declivity or grade. Upon reaching a level grade the brake is automatically withdrawn by the forward running-gear being pulled forward on the sliding bolster-plate.

Various slight modifications may be made in the details of construction, such as placing the brake to lock the rear instead of the front wheels, without departing from the spirit of my invention.

Having thus fully described my invention, what I claim as new, and desire to secure by Letters Patent, is—

1. In a road-vehicle, an axle, a brake-beam, a reach, a vertical, bifurcated lever pivoted to said reach and also to the vehicle-bed, the bifurcation of said lever straddling the reach, and a connection between the brake-beam and the pivoted lever, substantially as described.

2. In a road-vehicle, an axle, a brake-beam, a reach, a vertical lever pivoted to the reach, a bar one end thereof secured to the hind hounds and the other end constituting a pivot for one end of the lever, and a connection between the brake-beam and the pivoted lever, substantially as described.

3. In a road-vehicle, an axle, a bolster-plate constructed and arranged for longitudinal sliding movement, a brake-beam, a reach, a vertical, bifurcated lever pivotally connected to said reach and to the vehicle-bed, the bifurcation of said lever straddling the reach, and a connection between the pivoted lever and the brake-beam, substantially as described.

4. In a road-vehicle, a bolster-plate constructed and arranged for longitudinally-sliding movement, a bolster constructed and arranged to permit movement of the bolster-plate thereover, an axle supporting the bolster, a reach, a vertical, bifurcated lever pivoted thereto and to the vehicle-bed, the bifurcation of said lever straddling the reach, a brake-beam, and a connection between the brake-beam and the pivoted lever, substantially as described.

5. In combination with the bed of a road-vehicle, a detachable bolster-plate secured thereto and constructed and arranged for longitudinally-sliding movement with the wagon-bed, a bolster constructed and arranged to permit movement of the bolster-plate thereover, an axle supporting the bolster, a reach, a vertical, bifurcated lever pivoted thereto and to the vehicle-bed, the bifurcation of said lever straddling the reach, a brake-beam, and a connection between the brake-beam and the pivoted lever, substantially as described.

6. In combination with the bed of a road-vehicle, a detachable bolster-plate secured thereto and provided at its ends with grooves, a bolster carrying at its ends rollers working in the grooves of the bolster-plate, an axle supporting said bolster, a reach, a lever pivoted thereto and to the vehicle-bed, a brake-beam, and a connection between the brake-beam and the pivoted lever, substantially as described.

7. In combination with the bed of a road-vehicle, a detachable bolster-plate secured thereto and provided at its ends with grooves, a bolster carrying at its ends rollers working in the grooves of the bolster-plate, an axle supporting said bolster, a reach, a lever pivoted thereto and to the vehicle-bed, a brake-beam, and a bar connecting the brake-beam and the pivoted lever, substantially as described.

8. In combination with the bed of a road-vehicle, a detachable bolster-plate secured thereto and provided at its ends with grooves, a bolster, a head mounted on each end of the bolster, rollers pivoted in said heads and working in the grooves of the bolster-plate, a roller mounted in the upper surface of the bolster, an axle supporting the bolster, a reach, the rear end thereof loosely passing between the rear axle and rear bolster, hind hounds rigidly secured to the rear axle and constructed to slide on the reach, a bar one end thereof pivoted to the hind hounds, a lever pivoted to the reach and to one end of the bar, a brake-beam, and a connection between the brake-beam and the pivoted lever, substantially as described.

9. In combination with the bed of a road-vehicle, a detachable bolster-plate secured thereto and provided at its ends with grooves, a bolster, a head mounted on each end of the bolster, rollers pivoted in said heads and working in the grooves of the bolster-plate, a roller mounted in the upper surface of the bolster, an axle supporting the bolster, a reach, the rear end thereof loosely passing between the rear axle and rear bolster, hind hounds rigidly secured to the rear axle and constructed to slide on the reach, an adjustable bar one end thereof pivoted to the hind hounds, a lever pivoted to the reach and to one end of the bar, a brake-beam, and a connection between the brake-beam and the pivoted lever, substantially as described.

In testimony whereof I affix my signature in the presence of two subscribing witnesses.

SCHUYLER COLFAX BURSON.

Witnesses:
   WILLIAM E. SHOOK,
   LANKFORD SHAFER.